United States Patent
Marisy et al.

(10) Patent No.: US 7,210,570 B2
(45) Date of Patent: May 1, 2007

(54) DEVICE FOR THE DYNAMIC WEIGHING OF POSTAL ITEMS

(75) Inventors: Stéphane Marisy, Valence (FR); Alain Danjaume, Besayes (FR); Bernard Gaudriaud, Beauvallon (FR)

(73) Assignee: Solystic, Gentilly (FR)

( * ) Notice: Subject to any disclaimer, the term of this patent is extended or adjusted under 35 U.S.C. 154(b) by 374 days.

(21) Appl. No.: 10/483,639

(22) PCT Filed: Nov. 25, 2003

(86) PCT No.: PCT/FR03/50131

§ 371 (c)(1),
(2), (4) Date: Jan. 14, 2004

(87) PCT Pub. No.: WO2004/059263

PCT Pub. Date: Jul. 15, 2004

(65) Prior Publication Data

US 2006/0070851 A1    Apr. 6, 2006

(30) Foreign Application Priority Data

Dec. 23, 2002   (FR) .................................. 02 16551

(51) Int. Cl.
*B65G 15/00* (2006.01)
(52) U.S. Cl. ................ 198/626.1; 198/959; 177/24.14; 177/55
(58) Field of Classification Search ................ 198/959, 198/626.1, 626.3, 626.4, 571; 177/52–57, 177/25.14, 25.15, 25.19
See application file for complete search history.

(56) References Cited

U.S. PATENT DOCUMENTS

| 840,446 | A | * | 1/1907 | Ertheiler ................... 198/626.1 |
| 3,951,257 | A | * | 4/1976 | Storace et al. ........... 198/626.6 |
| 4,283,031 | A | * | 8/1981 | Finch .......................... 246/128 |
| 4,909,499 | A | * | 3/1990 | O'Brien et al. ........... 271/10.06 |
| 5,238,236 | A | * | 8/1993 | Belec et al. ................... 271/34 |
| 5,326,938 | A | * | 7/1994 | Tolson ............................ 177/5 |
| 5,684,275 | A | * | 11/1997 | Tolson ......................... 177/119 |
| 5,701,990 | A | * | 12/1997 | Novak et al. ................ 198/604 |

(Continued)

FOREIGN PATENT DOCUMENTS

EP         0 881 956 B1    12/1998

(Continued)

Primary Examiner—Gene O. Crawford
Assistant Examiner—Rashmi Sharma
(74) Attorney, Agent, or Firm—Sughrue Mion, PLLC

(57) ABSTRACT

The device for dynamically weighing postal items (P) comprises a plate (1) floatingly mounted on a weight sensor, and a conveyor belt mounted on the plate to move the postal items in a longitudinal direction (D) of the conveyor. The conveyor has two parallel conveyor belts (2C, 3C) which extend along the conveyor direction between a conveyor inlet (E) and a conveyor outlet (S), and between which the postal items are pinched and moved in series on edge. The two conveyors belts are engaged on a pair of first elastically deformable finned wheels (2A, 3A) disposed at the inlet (E) of the conveyor and being aligned perpendicularly to the longitudinal direction, and on a pair of second elastically deformable finned wheels (2B, 3B) disposed at the outlet (S) of the conveyor and being aligned perpendicularly to the longitudinal direction, and the operation of the weight sensor is based on the electromagnetic principle of flux compensation.

12 Claims, 4 Drawing Sheets

U.S. PATENT DOCUMENTS

| | | | |
|---|---|---|---|
| 5,726,393 A * | 3/1998 | Lyga ........................ | 177/25.15 |
| 6,564,928 B1 * | 5/2003 | Darrou et al. ............ | 198/626.1 |
| 6,595,348 B1 * | 7/2003 | Grasswill et al. ........... | 198/604 |
| 6,759,602 B2 * | 7/2004 | Miller et al. .............. | 177/25.15 |
| 6,949,710 B2 * | 9/2005 | Conard et al. ............ | 177/25.15 |

FOREIGN PATENT DOCUMENTS

| | | |
|---|---|---|
| FR | 2 795 396 A1 | 12/2000 |
| JP | 0291258 A2 * | 5/1988 |
| WO | WO 01/02278 A1 | 1/2001 |

* cited by examiner

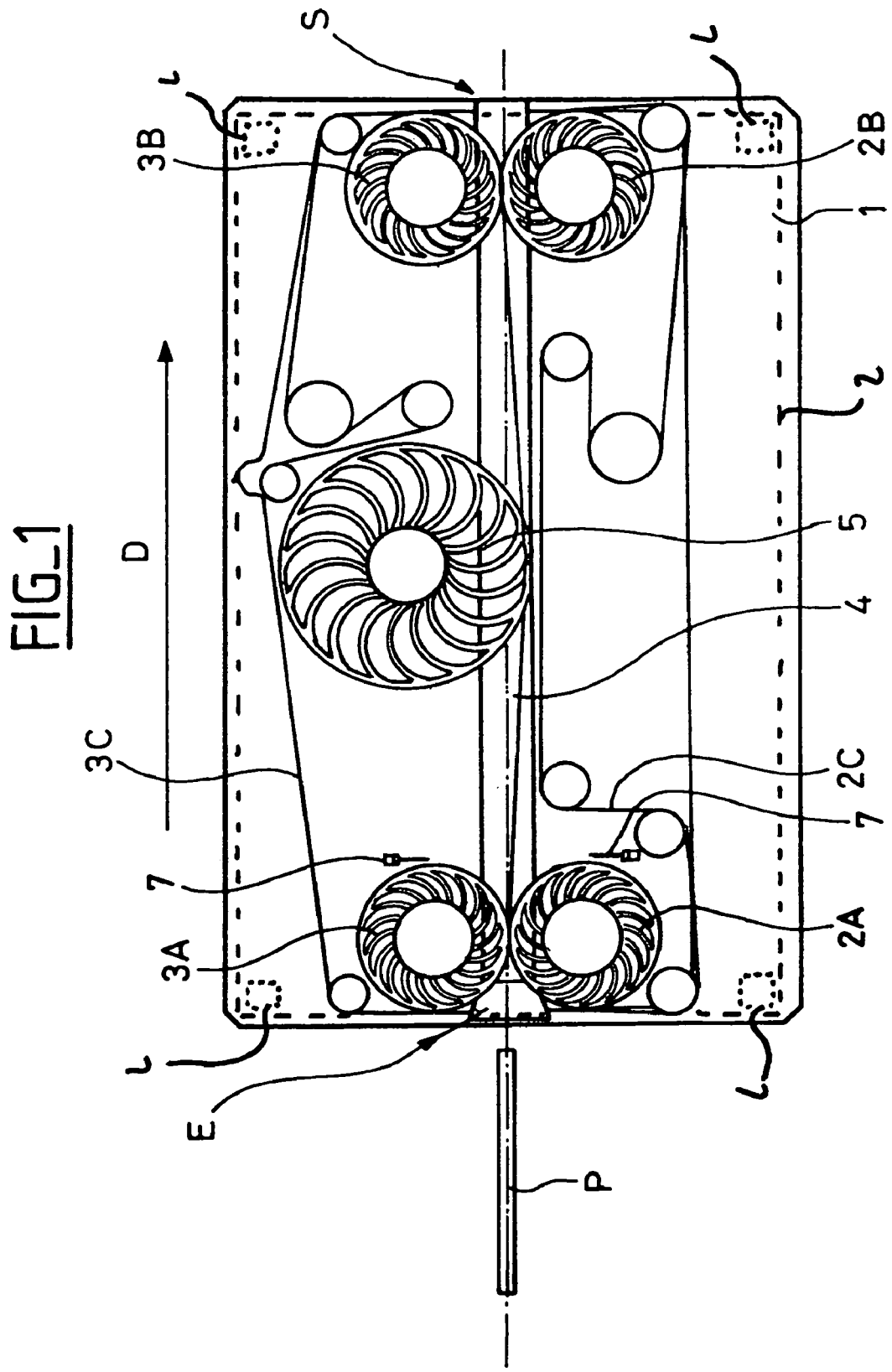

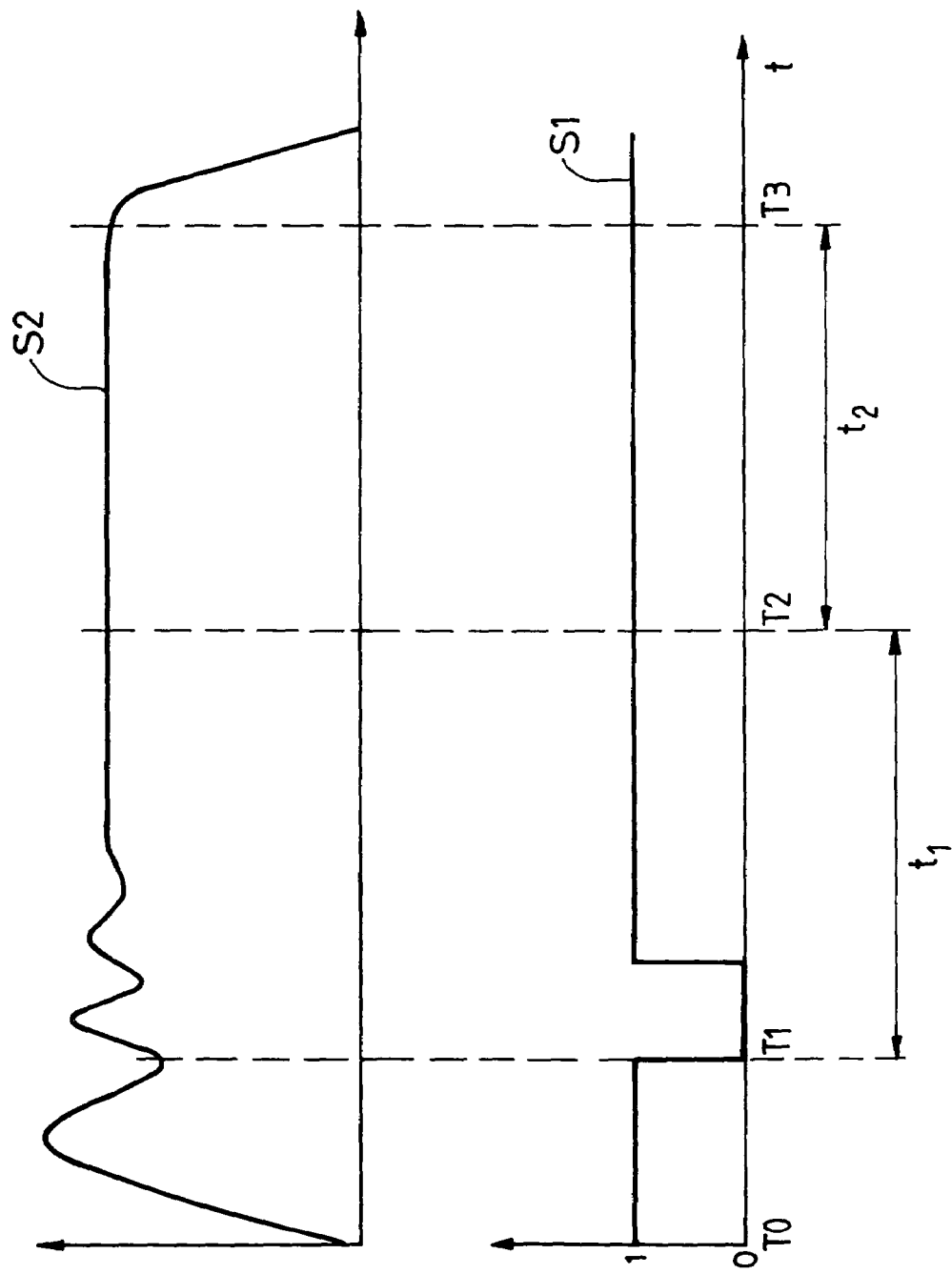
FIG_2

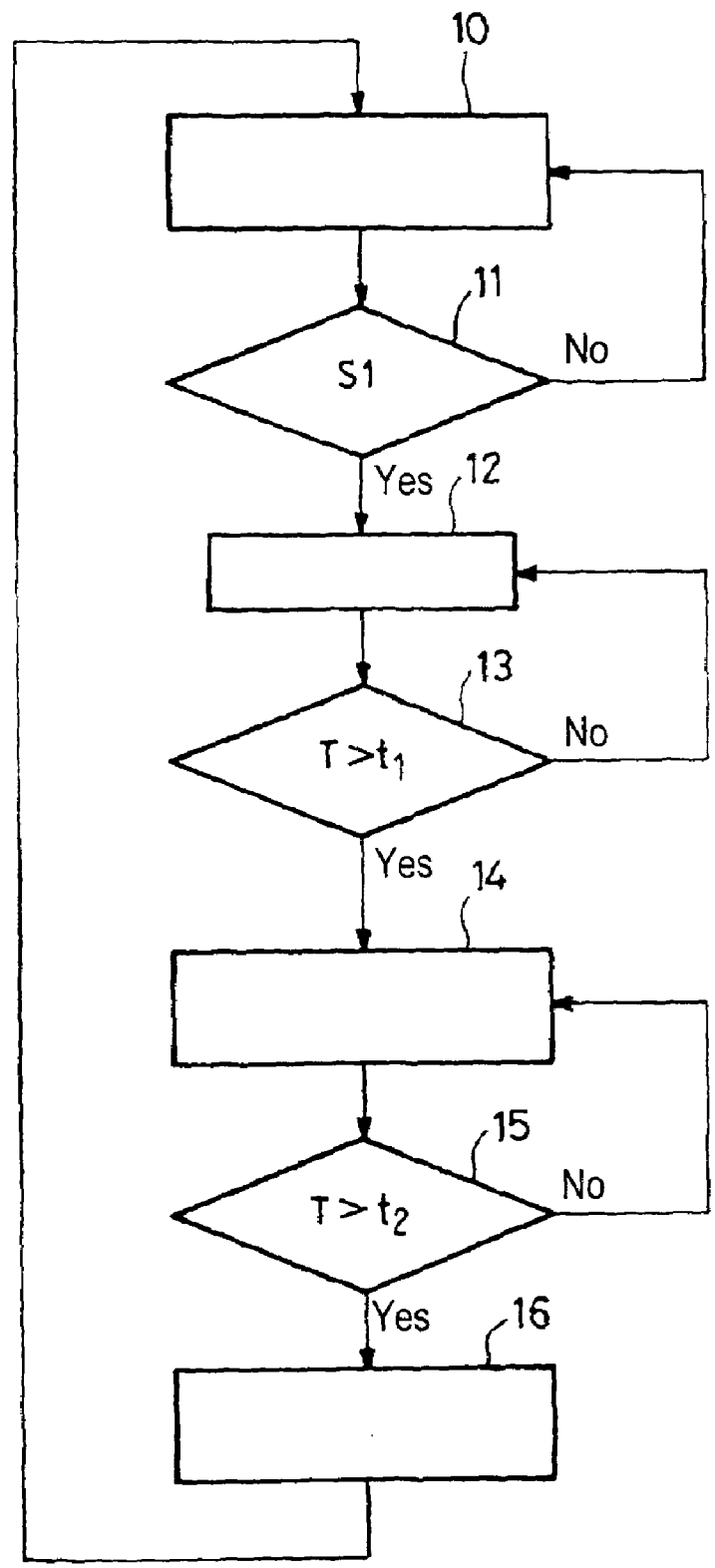
FIG_3

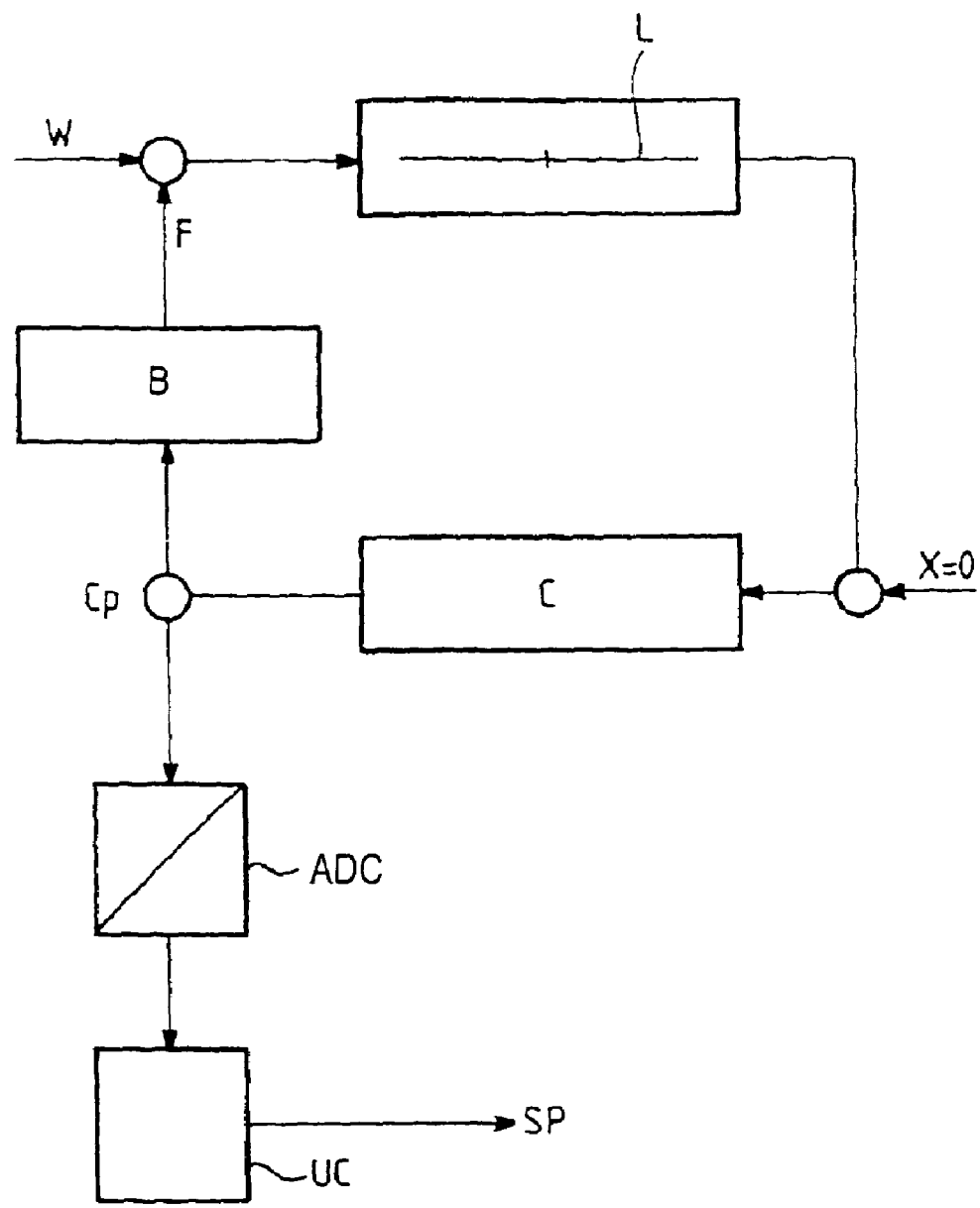
FIG_4

DEVICE FOR THE DYNAMIC WEIGHING OF POSTAL ITEMS

The invention relates to a device for dynamically weighing postal items, the device comprising a plate floatingly mounted on a weight sensor, and a conveyor belt mounted on the plate to move postal items in a longitudinal conveyor direction, the conveyor comprising two parallel conveyor belts extending along the conveyor direction between a conveyor inlet and a conveyor outlet, with the postal items being pinched therebetween and being moved in series standing on their edges.

Such a device is known from document EP-0 881 956. It is intended more particularly for fitting to a postal sorting machine in which postal items are moved in series standing on edge at a speed of about 3.15 meters per second (m/s) and at a rate of throughput lying in the range three to six postal items per second. That type of device can be used as additional means for defining, verifying, and checking the postage that has been applied to the postal items. The weight measured for each postal item can also be used as a sorting criterion in the sorting machine.

In the prior art device for dynamic weighing, the two conveyor belts are engaged on rigid rotary wheels disposed at the inlet and at the outlet of the conveyor path and they are offset from each other in the conveyor direction so that each postal item penetrates between the two conveyor belts obliquely relative to the conveyor direction on the plate. As a result each postal item is subjected to deformation on entering into the conveyor and on leaving the conveyor. That prior art arrangement is not reliable for weighing postal items of thickness that can vary over a wide range. At least for postal items that are thick and/or rigid, the folding deformation on entering the conveyor leads to mechanical impacts and vibration which disturb measurement accuracy. That system cannot process postal items that are very rigid.

The object of the invention is to provide a device for dynamically weighing postal items that can weigh reliably and with great accuracy a broad spectrum of postal items of thickness that may lie in the range 0.32 millimeters (mm) to 32 mm, and of weight that may lie in the range less than 20 grams (g) to 2000 g.

To this end, the invention provides a device for dynamically weighing postal items, the device comprising a plate floatingly mounted on a weight sensor, and a conveyor belt mounted on the plate to move postal items in a longitudinal conveyor direction, the conveyor comprising two parallel conveyor belts extending along the conveyor direction between a conveyor inlet and a conveyor outlet, with the postal items being pinched therebetween and being moved in series standing on their edges, the device being characterized in that the two conveyors belts are engaged on a pair of first elastically deformable finned wheels disposed at the inlet of the conveyor and aligned perpendicularly to the longitudinal direction, and on a pair of second elastically deformable finned wheels disposed at the outlet of the conveyor and aligned perpendicularly to the longitudinal direction, and in that the operation of the weight sensor is based on the electromagnetic principle of flux compensation.

With this arrangement, postal items are displaced between the inlet and the outlet of the conveyor in a direction that is substantially rectilinear, and as a result they are not subjected to deformation along the conveyor path. Mechanical vibration in the device of the invention is reduced by mounting the finned wheels on shafts secured to the plates and by using a weight sensor operating on the electromagnetic principle of flux compensation. With this device, postal items penetrating into the conveyor by passing between the two first finned wheels and the impacts caused by postal items fixed between these two finned wheels are absorbed by the elastic deformation of the finned wheels. The same applies at the outlet from the conveyor. With this arrangement, the number of moving parts in a dynamic weighing device is reduced, thereby making it easier to obtain great accuracy in measurement over a broad spectrum of postal items. In addition, reducing the number of parts helps to reduce the tare weight of the weighing device.

The dynamic weighing device of the invention presents the following features:

a fifth elastically deformable finned wheel disposed between the first finned wheels and the second finned wheels to pinch the two conveyor belts against a reference plate extending in the longitudinal direction;

the first and second finned wheels are of diameter smaller than the diameter of the fifth finned wheel; and a detector cell exposed between the first finned wheels and the fifth finned wheel in order to detect postal items passing along the longitudinal direction, the signals from the cell being used for controlling the weight sensor.

The invention also provides a postal sorting machine including a dynamic weighing device as defined above.

An embodiment of a device for dynamically weighing postal items in accordance with the invention is described below and is shown in the drawings.

FIG. 1 is a diagrammatic plan view of a device for dynamically weighing postal items in accordance with the invention.

FIG. 2 shows the relationship between the control signal produced by the cell for detecting passage and the weighing signal produced by the weight sensor.

FIG. 3 is a simplified flow chart showing the operation of the device for dynamically weighing postal items in accordance with the invention.

FIG. 4 is a diagram showing the principle of measuring weight by flux compensation.

FIG. 1 shows a belt conveyor mounted on a plate 1 which is floatingly mounted on a weight sensor 2 (visible in FIG. 1 in dotted lines). The plate 1 is a plate of substantially rectangular shape.

The operation of the weight sensor is based on the electromagnetic principle of flux compensation. The principle of measurement by flux compensation, also known as magnetic force restoration (MFR) is shown in FIG. 4. The applied load W on one end of a lever L is compensated actively by an opposing electromagnetic force F produced by a compensation current Cp passing through an electric coil B placed at the other end of the lever. Precision control C keeps the system stable so that it functions without moving vertically. The compensation current Cp is sent to a processor UC via a high resolution analog-to-digital converter ADC which delivers digital information representative of the weight W of the load. In the device of the invention, it is possible to use four levers L placed respectively at the four corners of the plate as shown in FIG. 1, with the compensation current produced by the precision control signals being delivered to the processor UC. In this arrangement, the center of gravity of the plate fitted with the belt conveyor lies vertically over the weight sensor that receives the levers.

The belt conveyor of the invention comprise a pair of first finned wheels 2A, 3A having respective rims that are radially deformable in elastic manner. These finned wheels 2A, 3A are disposed at the inlet E of the conveyor in perpendicular alignment to the longitudinal direction D in which postal items are conveyed on the plate 1. The belt conveyor also has a pair of second finned wheels 2B, 3B with respective rims that are radially deformable in elastic manner disposed at the outlet S from the conveyor 1, being aligned perpendicularly to the direction D. As can be seen in FIG. 1, the two finned wheels 2A, 3A are placed against each other so as to pinch postal items. The same applies to the two finned wheels 2B, 3B.

A first conveyor belt 2C is engaged on the finned wheels 2A, 2B, and a second conveyor belt 3C is engaged on the finned wheels 3A, 3B. The two conveyor belts 2C, 3C extend parallel to each other along the conveyor direction D and hold the postal items by clamping them so that they move standing on edge in series along the direction D. The conveyor belts are driven by means of a self-contained electric motor (not shown) fixed on the plate 1.

With this arrangement of a conveyor having finned wheels, each postal item such as P penetrates at the inlet of the conveyor by passing between the two finned wheels 2A, 2B, and leaves the conveyor by passing between the two finned wheels 3A, 3B. The postal item thus follows a substantially rectilinear path between the inlet and the outlet of the conveyor, said path extending along the direction D.

In order to reduce slackness on the postal items at the inlet and the outlet of the conveyor, it is preferable to use finned wheels of small diameter, for example finned wheels having a diameter of about 150 mm.

The length of the conveyor between the inlet E and the outlet S is about 500 mm to 900 mm. The bottoms of the postal items are guided on the plate 1 by a trough 4 extending along the direction D. The trough 4 is of width slightly greater than the maximum width of a postal item, which in the present case is 32 mm. The trough has a flared end at the inlet E to the conveyor. As can be seen in FIG. 1, the finned wheels 2A to 3B are disposed on the plate in such a manner that the two parallel belts 2C, 3C are disposed in a plane extending transversely to the middle of the trough 4 and in which the center of gravity of the fitted plate (and thus the weight sensor) is situated.

A fifth finned wheel 5 having a rim that is elastically deformable in a radial direction is also disposed between the pair of finned wheels 2A, 3A and the pair of finned wheels 2B, 3B so as to pinch the two belts 2C, 3C against a side wall of the trough 4 which serves as a reference surface, thereby preventing the postal items from sliding while they are being conveyed along the direction D. The finned wheel 5 has an outside diameter that is greater than that of the finned wheels 2A to 3B, in this case about 250 mm, since it needs to be capable of being flattened by twice as much as the finned wheels 2A to 3B.

A passage-detection cell 7, e.g. using light emitting and receiving diodes, is disposed between the wheels 2A, 3A and the wheel 5 so as to detect the passage of postal items along the conveyor. The detection signals delivered by the cell 7 serve to control the weight sensor as described below. A backing pulley or a sixth finned wheel like the wheel 5 can be placed facing the wheel 4 in order to improve the operation of the weighing system.

The finned wheels 2A to 3B and 5 have axes of rotation that are stationary relative to the plate.

In FIG. 2, S1 represents the signal which is delivered by the detection cell 7. The signal S1 presents a transition at an instant T1 which corresponds to the instant at which the cell 7 detects the leading edge of a postal item going past. S2 represents the analog measurement signal supplied by the precision command of a weighing sensor. At instant T0, the postal item penetrates into the conveyor. At instant T2, it lies between the pair of wheels 2A, 3A, and the pair of wheels 2B, 3B, and at instant T3 the leading edge of the postal item reaches the end S of the conveyor.

In FIG. 2, it can be seen that the signal S2 oscillates between instants T0 and T1, but becomes stable as from instant T2.

The flow chart of FIG. 3 shows how the weighing device operates, and in particular it shows how the processor UC shown in FIG. 4 operates.

The processor UC is in a waiting loop 10, 11 so long as the signal S1 does not indicate that a postal item is going past the cell 7.

When a transition is detected in the signal S1 at 11, then the processor UC occupies a waiting loop 12, 13 until a timeout t1 (T2–T1) has elapsed. At the end of the timeout t1, the processor UC enters a loop 14 in which it digitizes the signal S2 during a period t2 (equal to T3–T2) which is timed at 15. After that, the processor UC acts at 16 to calculate the weight of the postal item (e.g. by taking the average of instantaneous values for the signal S2 as measured between the instants T2 and T3) and processing restarts at 10 for a new postal item. In practice, given the travel speed of postal items of 3.15 m/s, and given the length of the plate which is about 750 mm, t1 is about 150 milliseconds (ms) while t2 is about 88 ms.

Tests have shown that with the weighing device of the invention, it is possible to perform weighing dynamically with precision of better than 10 grams and with an error rate of less than 1.1%. This can be performed on postal items traveling at an average speed of 3.15 m/s at a throughput rate of three to six items per second, with the items being of any thickness in the range 0.23 mm to 32 mm, and being of length lying in the range 140 mm to 400 mm, and of height lying in the range 90 mm to 300 mm, with a weight lying in the range 20 g to 2000 g.

Naturally, the device of the invention could be used for dynamically weighing postal items of small format, and also flat items of other types that are displaced at a constant speed while standing on edge.

The invention claimed is:

1. A device for dynamically weighing a postal item, comprising:
   a plate floatingly mounted on a weight sensor; and
   a belt conveyor mounted on the plate to move the postal item in a longitudinal conveyor direction;
   an inlet and an outlet;
   a first pair of wheels mounted on the plate at or near the inlet, the first pair of wheels being elastically deformable;
   a second pair of wheels mounted on the plate at or near the outlet, the second pair of wheels being elastically deformable; and
   weighing electronics that weigh the postal item based on a signal from the weight sensor and using the electromagnetic principle of flux compensation; and
   wherein the belt conveyor comprises two vertically oriented parallel conveyor belts extending along the conveyor direction between the inlet and the outlet, so that the postal item is pinched between the two parallel conveyor belts and remains on edge while weight measurements are taken by the weighing electronics.

2. The device according to claim 1, wherein the first pair of wheels and the second pair of wheels are finned.

3. The device according to claim 1, wherein the first pair of wheels and the second pair of wheels are aligned perpendicularly to the longitudinal direction.

4. The device according to claim 1, wherein the first pair of wheels limit the permissible width of the postal item to about 32 mm.

5. The device according to claim 1, wherein the first pair of wheels are finned.

6. The device according to claim 1, further comprising a trough that receives the edge of the postal item while being conveyed between the inlet and the outlet.

7. The device according to claim 1, wherein the two conveyor belts are engaged on the first pair of wheels.

8. The device according to claim 1, wherein each of the first pair of wheels are aligned directly opposite each other in the conveyor direction and each of the second pair of wheels are aligned directly opposite each other in the conveyor direction so that the postal item is conveyed in a rectilinear path from the inlet to the outlet without subjecting the postal item to deformation.

9. The device according to claim 1, including a fifth elastically deformable finned wheel (5) disposed between the first finned wheels and the second finned wheels to pinch the two conveyor belts against a reference plate (4) extending in the longitudinal direction.

10. The device according to claim 3, in which the first and second finned wheels are of diameter smaller than the diameter of the fifth finned wheel.

11. The device according to claim 4, including a detector cell (7) exposed between the first finned wheels and the fifth finned wheel in order to detect postal items passing along the longitudinal direction, the signals (S1) from the cell being used for controlling the weight sensor.

12. A device for dynamically weighing postal items (P), the device comprising:
  a plate (1) floatingly mounted on a weight sensor;
  a belt conveyor mounted on the plate to move postal items in a longitudinal conveyor direction, the conveyor comprising two parallel conveyor belts (2C, 3C) extending along the conveyor direction between a conveyor inlet and a conveyor outlet, so that postal items are being pinched between the two parallel conveyor belts and being moved in series standing on their edges;
  a pair of first elastically deformable finned wheels (2A, 3A) on which the two conveyor belts are engaged are disposed at the inlet (E) of the conveyor and aligned perpendicularly to the longitudinal direction;
  a pair of second elastically deformable finned wheels (2B, 3B) on which the two conveyor belts are engaged are disposed at the outlet (S) of the conveyor and aligned perpendicularly to the longitudinal direction;
  a computer processor that controls weighing the postal items so as to calculate a weight of a postal item based on a signal corresponding to the weight of the postal item only when the postal item is located between the first finned wheels and the second finned wheels; and
  wherein the operation of the weight sensor is based on the electromagnetic principle of flux compensation.

* * * * *